United States Patent [19]

Ito et al.

[11] 4,045,807
[45] Aug. 30, 1977

[54] AUTOMATIC EXPOSURE CONTROL APPARATUS WHICH PREVENTS SIMULTANEOUS DIAPHRAGM AND SHUTTER SPEED PRESELECTION

[75] Inventors: Fumio Ito; Tadashi Ito, both of Yokohama; Yasuo Isobe, Kawasaki; Soichi Nakamoto, Machida, all of Japan

[73] Assignee: Canon Kabushiki Kaisha, Tokyo, Japan

[21] Appl. No.: 638,029

[22] Filed: Dec. 5, 1975

Related U.S. Application Data

[63] Continuation of Ser. No. 482,895, June 25, 1974, abandoned.

[30] Foreign Application Priority Data

June 27, 1973  Japan .................................. 48-72398

[51] Int. Cl.² ........................... G03B 7/08; G03B 9/00
[52] U.S. Cl. ....................................... 354/38; 354/47; 354/228

[58] Field of Search ................. 354/26, 29, 30, 36, 354/38, 47, 228, 231

[56] References Cited

U.S. PATENT DOCUMENTS

| 3,103,149 | 9/1963 | Ohara ................................. 354/36 |
| 3,122,083 | 2/1964 | Gebele et al. ........................ 354/228 |
| 3,517,594 | 6/1970 | Kitai ................................... 354/47 |

Primary Examiner—L. T. Hix
Assistant Examiner—J. A. LaBarre
Attorney, Agent, or Firm—Toren, McGeady and Stanger

[57] ABSTRACT

An automatic exposure control apparatus for a single lens reflex camera equipped with a shutter speed preselection exposure range and a diaphragm aperture preselection exposure range. When the apparatus is set for operation in the shutter speed preselection exposure range, the shutter speed preselecting dial is incapable of being set to its automatic adjustment position. When set for operation in the diaphragm aperture preselection exposure range, the diaphragm aperture preselecting dial is incapable of being set to its automatic adjustment positon.

6 Claims, 8 Drawing Figures

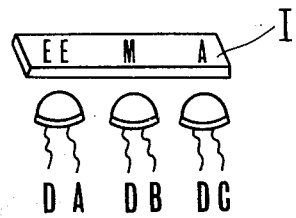
FIG.2B
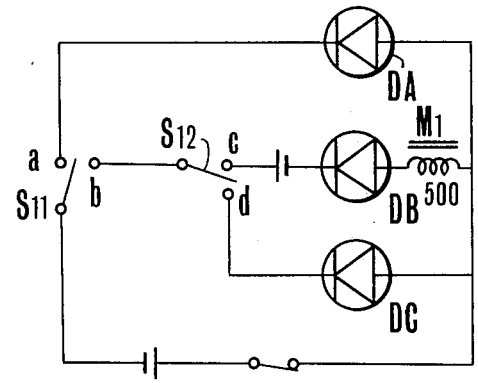
FIG.2A
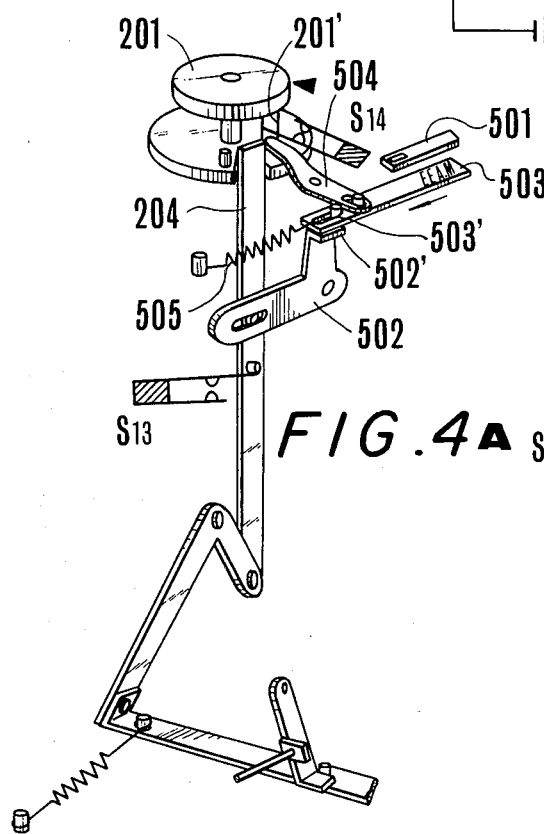
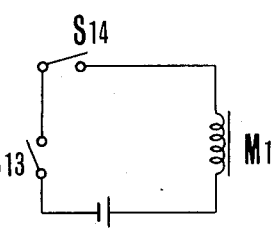
FIG.4B
FIG.4A

AUTOMATIC EXPOSURE CONTROL APPARATUS WHICH PREVENTS SIMULTANEOUS DIAPHRAGM AND SHUTTER SPEED PRESELECTION

This is a continuation of application Ser. No. 482,895 which was filed June 25, 1974, now abandoned.

This invention relates to a photographic camera with an automatic exposure control apparatus capable of selective operation for a shutter speed preselection automatic exposure aperture control and a diaphragm aperture preselection automatic shutter speed control.

Cameras of this type are well known in the art. It is also known in such cameras that accidental simultaneous settings of the diaphragm mechanism and the shutter mechanism to their automatic control operation conditions result in incapability of deriving the exposure value.

It is a primary object of the present invention to provide a photographic camera of the type described which enables the operator to reliably prevent the aforesaid accidental simultaneous settings.

To achieve this object, the structure according to one embodiment of the invention includes a first detent means movable to a predetermined position when the shutter speed preselecting means is set to its automatic adjustment position, a second detent means movable to a predetermined position when the diaphragm aperture preselecting means is set to its automatic adjustment position and interfering means movable to interfere with the movement of either of said first and second detent means to its predetermined position, so that upon setting of one of said preselecting means to its automatic adjustment position, the other preselecting means cannot be set to its automatic adjustment position.

Other objects and features of the present invention will be described in detail with reference to the accompanying drawings in which:

FIG. 2A is an electrical circuit diagram of an example of the display device incorporated in the viewfinder of FIG. 1A.

FIG. 2B is a fragmentary perspective view of an arrangement of parts of the display device of FIG. 2A.

FIG. 4A is a fragmentary perspective view of another example of the display device.

FIG. 4B is an electrical circuit diagram of the display device of FIG. 4A.

Figure 1A:
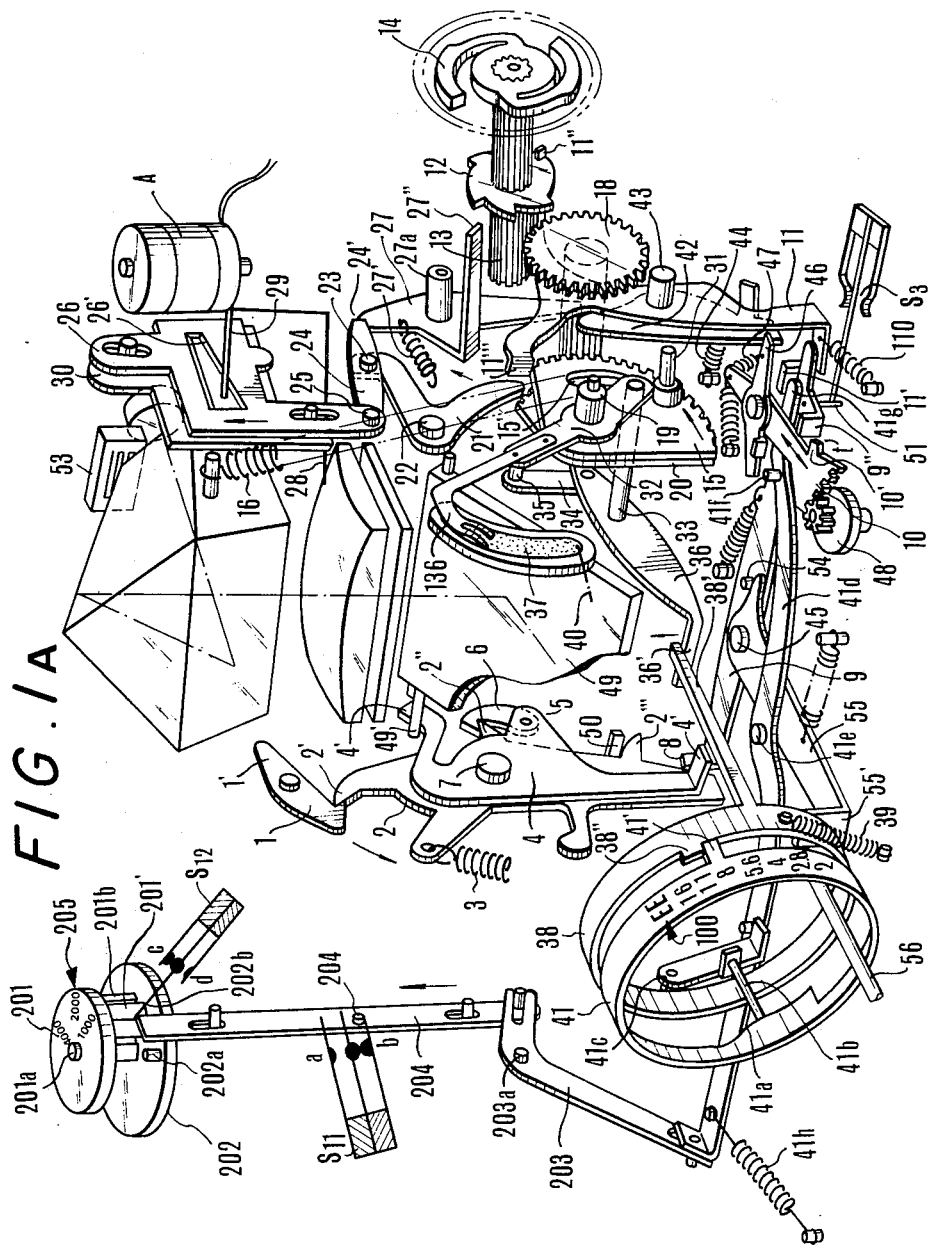
FIG. 1A is a schematic view in perspective of an automatic exposure control apparatus of a single lens reflex camera with a structure embodiing one form of the present invention.
Figure 1B:
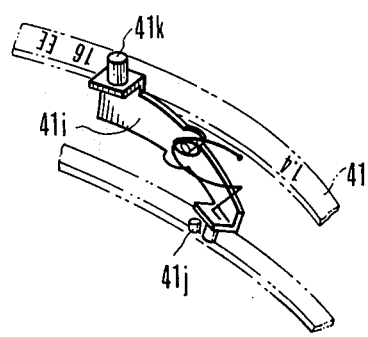
FIG. 1B is a fragmentary perspective view of a locking means provided in the diaphragm aperture-preselecting ring of FIG. 1A.

Referring now to FIG. 1A, there are shown various elements of an automatic exposure control apparatus in a single lens reflex camera set for operation in the shutter speed preselection exposure range (EE) and in an operative position following the shutter charging. The shutter speed preselecting means comprises a dial 201 having a scale of shutter speeds and an "Auto" symbol, this scale and symbol cooperating with a stationary index 205, and rotatably mounted on a plate 202 constituting part of the camera body, a spring-biased pin 201b mounted in the dial 201 upon alignment of the symbol "Auto" with the index 205 to engage in a hole 202b provided in the plate 202 thereby the dial 201 is locked in position, a lock-release pin 201a mounted together with the pin 201b on a lever (not shown) which is pivotally mounted on the lower face of the dial 201 in a suitable manner known in the art accordingly, upon depression of the pin 201 against the force of a spring, the pin 201b is disengaged from the hole 202b to permit the rotation of the dial 201. The dial 201 is further provided with a slide brush mounted on the lower face thereof to control the resistance value of a variable resistor 52 (FIG. 3) in accordance with the preselected shutter speed. The first detent means of the present invention is constructed in the form of a fixed pin 201' extending from the lower face of the dial 201 and arranged to make it impossible to align the symbol "Auto" with the index 205 when the diaphragm aperture-preselecting means is set to its automatic adjustment position. The diaphragm aperture-preselecting means comprises a ring 41 which is rotatable about the optical axis and has a scale of diaphragm aperture values and a symbol "EE", this scale and symbol cooperating with a stationary index 100. For exposure operations in the shutter speed preselection exposure range, the operator turns the ring 41 to place the symbol "EE" in alignment with the index 100 as shown in FIG. 1A, and then the dial 201 to place a desired shutter speed graduation in alignment with the index 205. The ring 41 is provided with a change-over cam 41a for engagement with a cam follower pin 41b mounted on a lug of a lever 41c, the parts 47b and 41c constituting the second detent means of the invention. The movement of the ring 41 to place the symbol EE in alignment with the index 100 causes the cam mechanism 41a, 41b and 41c to turn a lever 41d about a pivot pin 41e in a clockwise direction against the bias of a spring 41h. The pivotal movement of the lever 41d is transmitted through a lever 203 fulcrumed at a pivot pin 203a to a slide 204 which is then driven upwardly in the direction indicated by the arrow, so that the upper end portion of the slide 204 extends through a cutout provided in the plate 202 into a space in which the detent pin 201 is positioned when the symbol "Auto" on the dial 201 is brought into alignment with the index 205 to prevent the shutter speed preselecting dial 201 from being set to its automatic adjustment position. The parts 41d, 203 and 204 constitute part of the interfering means of the invention. Upon setting of the ring 41 to the EE position, it is locked in position by a locking lever 41i which at one end has a pin 41j for engagement with a hole provided in a lens barrel not shown and at the other end has a lock-release button 41k. At the same time, a switch $S_{11}$ positioned adjacent the lever 204 is operated so that its movable contact is brought into contact with a fixed contact, a in engagement with an insulated pin 204a. Accordingly an illumination diode DA (see FIG. 2A) is energized to illuminate characters EE on a display plate I (FIG. 2B). These can be seen in the field of view of the finder by the camera operator looking therethrough indicating that the camera is rendered operative in the shutter speed preselection exposure range.

For exposure operations in the diaphragm aperture preselection exposure range following the shutter speed preselection exposure control operation, depressing the lock-release button 41k, the operator can turn the ring 41 to place a desired diaphragm aperture graduation in alignment with the index 100, thereby the camming edge 41a is moved away from the cam follower pin 41b to cause a counter-clockwise movement of the lever 41d under the force of the spring 41h. Such a movement of the lever 41d causes a downward movement of the slide 204 so that the upper end of the slide 204 is retarded from the entire range of the movement of the detent pin 201' to permit for the operator to set the dial 201 to the "Auto" position. Upon setting of the dial 201 thereto, the detent pin 201' is brought into alignment with the slide 204 to hinder the upward advance of the slide 204. So long as the slide 204 remains in the retarded position, the second detent means 41b and 41c cannot be moved to a position capable of setting the ring 41 to the EE position. When the ring 41 is turned to place the symbol EE out of alignment with the index 100, the slide 204 is downwardly moved to set the switch $S_{11}$ from the position, a, to the position, b, and the switch $S_{12}$ from the position, c, to the position, d, to connect the illumination diode DC to the power source, thereby the character A on the display plate I is illuminated to teach the camera operator looking through the finder that the camera is rendered operative in the diaphragm aperture preselection exposure range.

The operation of the apparatus for formation of diaphragm aperture in conformance to the preselected shutter speed is as follows. The depression of a shutter release button not shown causes the hook of a release lever 1 to disengage from a main lever 2 which is then turned about a shaft 7 in a counter-clockwise direction as viewed in FIG. 1A under the force of a helical spring 3 and simultaneously a mirror control lever 4 is turned about the shaft 7 by engagement of a pawl 6 mounted at a pin 5 on the lever 4 with a projection 2" extending from the lever 2, so that the mirror 49 pivots from its viewing position to its non-viewing position in engagement of one arm 4' of the lever 4 with a rod 49' extending from a mirror support. At the same time, a lever 9 which has a rectangularly bent portion 8 normally engaging a rectangularly bent portion 4' of the lever 4 is turned about a pivot pin 45 by an angular distance, t, between the extension 9' of the lever 9 and the extension 10' of a first sector gear 10 to permit a locking lever 11 to turn about a shaft 43 in a clockwise direction under the force of a helical spring 110, thereupon an extension 11" of the lever 11 is disengaged from one tooth of a toothed wheel constituting part of a governor mechanism and another extension 11''' is disengaged from a second sector gear 15. Then the sector gear 15 is turned about a shaft 19 in a counter-clockwise direction, while the speed of the sector gear 15 is maintained constant by the governor mechanism comprising a pinion 17 engaging the sector gear 15, a gear 18 coaxial to the pinion 17 and engaging another pinion 13 and an inertia member 14 mounted on the shaft of the pinion 13. As the sector gear 15 is turned, a cam member 20 mounted thereon as unison is turned about the same shaft 19 and a cam follower lever 21 is turned about its pivot pin 22 in a counter-clockwise direction, thereby an equalizer 24 which is pivotable about a pin 23 mounted on one arm of the lever 21 is turned about a point at which one arm 24' of the equalizer 24 engages one arm of a stopper lever 27 at the ends thereof to move upwardly a slide 26.

On the other hand, responsive to the level of brightness of a photographic subject as sensed by a sensor 53 through the objective lens with a fully opened diaphragm aperture, and the settings of the film speed and a desired shutter speed, a first exposure value-computing circuit 57 (see FIG. 3) derives an effective exposure aperture which is indicated in the field of view of the finder by means of a needle 28 of the exposure meter A which determines the diaphragm value. Therewith, another needle 29 of the meter A is pressed against a stationary abutment 30 by a scanning slide plate 26, whereby the final position of the slide plate 26 depends upon the position of the deflected needle 29. Cooperating with the cramping of the needle 29, the further turning movement of the sector gear 15 causes the equalizer 24 to turn about the pivot pin 25, so that the end 24' of the equalizer 24 is disengaged from the stopper lever 27 which is then turned about a shaft 27a in a counter-clockwise direction under the force of a helical spring 27' until a rectangularly bent portion 27" engages one tooth of the wheel 12, thereupon the sector gear 15 is locked in position.

Figure 1C:
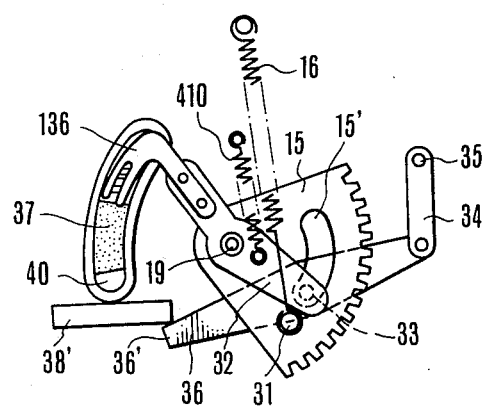
FIG. 1C is a fragmentary elevational view illustrating a linked relationship between the automatic diaphragm control lever and the shutter speed control resistor of FIG. 1A.

In FIG. 1C, as the sector gear 15 is turned about the shaft 19, a lever 32 which is fulcrumed at the shaft 19 is turned in engagement of the pin 33 mounted on one arm thereof with the end portion of an arcuated slot 15' provided through the sector gear 15 to cause a sliding movement of a brush 136 mounted on the other arm of the lever 32 on a resistance element, the brush and element constituting a shutter speed control resistor 37 of the exposure control circuit (FIG. 3), thereby the resistance value of the resistor 37 is controlled as a function of the position of the sector gear 15, i.e., as a function of the position of the deflected exposure meter needle. On the other hand, the turning movement of the sector gear 15 causes a diaphragm control lever 36 movably mounted on the lever 32 at the pin 33 to move upwardly at an arm 34 to which one end of the control lever 36 is connected is supported by a shaft 35 mounted on the camera housing. The upward movement of the control lever 36 causes a diaphragm-setting ring 38 to turn against the bias of the spring 39 in engagement of the rectangularly bent portion 36' of the control lever 36 with a lug 38' extending from the ring 38 rearwardly in parallel to the optical axis until the ring 38 assumes a position for selecting a diaphragm aperture corresponding to the position of the deflected needle 29. In other words, the scanning slide plate 26, the cam member 20 and the linking elements therefor are provided for selecting a diaphragm aperture as a function of the position of the deflected needle 29, i.e., with conformance to the selected film speed and shutter speed. Thus the adjusted resistance value of the variable resistor 37 and the selected diaphragm aperture value are related to each other. When the stopper lever 27 is disengaged from a returning lever 42, the latter is turned in a clockwise direction under the force of a spring 44, thereby the lower end of the lever 42 urges one arm of the lever 46 pivoted at the shaft coaxial to that of the sector gear 10 against the bias of a spring 47 which turns the sector gear 10 engaging the retarding governor 48 to result in the disengagement of the lug 10' of the sector gear 10 from the lever 9, thereupon the lever 9 is turned about the shaft 45 in a clockwise direction as the mirror control lever 4 connected by the pawl 6 to the main lever 2 is turned under the force of the spring 3. The pivotal movement of the lever 9 is transmitted through a pin 9 mounted thereon to the diaphragm operable lever 55, so that a link 56 connected to the diaphragm ring of the interchangeable objective and abuttingly engaging a rectangularly bent portion 55' of the lever 55 is moved to a position where the diaphragm blades provide a diaphragm aperture selected by the diaphragm-setting ring 38. The pivotal movement of the lever 4 causes the mirror 49 to move from its viewing position to its nonviewing position, and at the same time, the movement of the main lever 2 connected to the lever 4 results in a release of the shutter locking lever 50, thereby the focal plane shutter is actuated to permit the front curtain to run down. When the duration of an exposure interval is terminated, the pawl 6 is disengaged from the projection 2" by a not shown mechanism so that the lever 4 is turned in a clockwise direction to regain its initial position as illustrated in FIG. 1A.

As mentioned above, when the mirror 49 pivots in response to release of the shutter release lever 1 from its locked position, light from the subject being photographed is blocked from the finder system in which the sensor 53 is arranged to receive the light. During the exposure operation, therefore, the sensor 53 provides no information representative of the level of brightness of the subject being photographed. With the exposure control circuit adapted for use in the apparatus of FIG. 1A as will be described later, it is necessary to incorporate therein means for storing information representative of the level of brightness of the subject as sensed photoelectrically just prior to the initiation of the exposure of the photographic film associated in the camera. According to the present invention, the store means comprises the variable resistor 37 arranged so that the resistance value thereof is adjusted in conformance with the selected diaphragm aperture value to store therein the information representative of the subject brightness level. Therefore, the apparatus is designed so that after the shutter speed control resistor 37 has been adjusted, the lever 9 is released from the locked position to open the switch $S_3$ in engagement with a pin 51 mounted on the end portion of the lever 9, thereupon the storing process comes to the end, and the further pivotal movement of the lever 9 results in the adjustment of the diaphragm means to the selected exposure aperture through the intermediary of the pin 54, lever 55 and link 56. After the actuation of the shutter mechanism, the exposure interval is controlled in accordance with the resistance value of the variable resistor 37 with an accuracy such that some mechanical error in the positions of the deflected needle 29 and the arrested wheel 12 which will result in an improper setting of the diaphragm-setting ring 38 can be compensated for by employing as a new shutter speed control factor the adjusted resistance value of the resistor 37 which is accurately related with the selected diaphragm aperture value provided that the tolerance in the diaphragm blade assembly of the interchangeable objective employed is within the specified range.

The operation of the apparatus of FIG. 1A for formation of shutter speed opening in conformance with the preselected diaphragm aperture is as follows. As the diaphragm-preselecting ring 41 is turned to place a desired diaphragm aperture graduation in alignment with the index 100, the diaphragm-setting ring 38 is turned in engagement of the projection 38" of the ring 38 with the lug 41' against the bias of the spring 39 to upwardly displace the extension 38' abuttingly engaging the extension 36' of the diaphragm control lever 36 under the force of the lever 410, so that the upward movement of the lever 36 causes the pin 33 interconnecting the levers 32 and 36 to slide along the arcuated slot 15', thereby the lever 32 is turned to adjust the resistance of the variable resistor 37 in accordance with the selected diaphragm aperture. Thus the exposure interval is adjusted in conformance with the preselected diaphragm aperture. On the other hand, upon movement of the ring 41 to place the symbol EE out of alignment with the index 100, the lever 41d is turned in the counter-clockwise direction causing the lever end 41g to arrest the locking lever 11 so that when the lever 1 is released the sector gear 15 does not operate, and also causing the pin 41f mounted thereon to turn the sector gear 10 in the clockwise direction through the intermediary of the lever 46 and the spring 47, so that the extension 10' of the sector gear 10 is retarded from the range of the movement of the projection 9" of the lever 9 to permit the normal pivot movement of the mirror 49 and the automatic diaphragm control.

For exposure operation in a manually operating ranges, the operator turns the diaphragm preselecting ring 41 and the shutter speed preselecting dial 201 to place the desired shutter speed and diaphragm aperture and shutter speed graduations in alignment with the indices 205 and 100 respectively. The switch S11 and S12 are automatically operated to close the sides $b$ and $c$ respectively to connect the illumination diode DB to the power source, thereby the character M on the display plate I is illuminated. At the same time, the electromagnet M1 is energized to set each of the switches S9 and S10 from the position, $a$, to the position, $b$.

Figure 3:
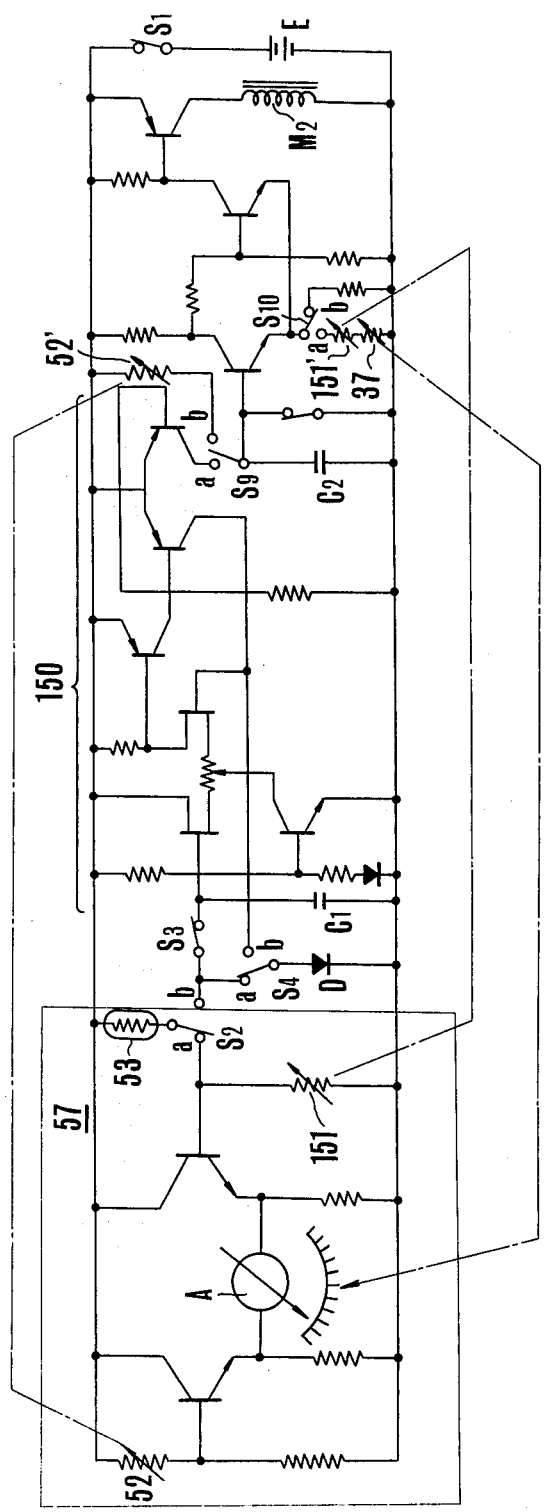
FIG. 3 is an electrical circuit diagram of the apparatus of FIG. 1A.

As shown in FIG. 3, the exposure control circuit adapted for use in the apparatus of FIG. 1A is constructed as including a power source E, a power switch S1, an exposure aperture control circuit section 57 enclosed by dot-dash lines, an information regenerator circuit 150, and a switching circuit connected to an electromagnet for holding the rear curtain of the focal plane shutter in the opening position. The circuit section 57 which is rendered operative when the apparatus is set for operation in the shutter speed preselection exposure range includes a shutter speed setting variable resistor 52, an exposure meter A, a film speed setting variable resistor 151, a sensor 53 arranged in the finder system to receive light from the subject being photographed and connected in series to a compression diode D through switches S2 and S4. The circuit section 150 includes a store condenser C7, a condenser C2 constituting part of a time constant circuit and manual change-over switches S9 and S10.

When the power switch S1 is closed in response to the depression of the shutter release button, the position of the needle of the meter A is adjusted in accordance with the resistances of the shutter speed setting resistor 52, film speed setting resistor 151 and sensor 53 to determine an effective exposure aperture, and simultaneously the resistance of the resistor 37 is adjusted in accordance with the effective exposure aperture. Upon further depression of the shutter release button, the switch S2 is set from the position, $a$, to the position, $b$, and the switch S2 is turned off, so that a voltage proportional to the level of brightness of the subject sensed by the sensor 53 is compressed by the diode D and is stored on the store condenser C2. When the switch S8 is turned off in response to the running down of the front curtain, a current controlled by the information regenerator circuit section 150 is allowed to flow to the condenser C2. When the voltage across the condenser C2 reaches the trigger level of the switching circuit in a time interval dependent upon the resistances corresponding to the film speed and diaphragm aperture respectively, the electromagnet M2 is energized to release the rear curtain from the arrested position to effect a correct exposure.

The invention has been described above in connection of a purely schematic example which can be changed in some ways. For example, instead of a plurality of illumination diodes in the display device, it is possible to use mechanical components as shown in FIG. 4A, where the camera is set for operation in the shutter speed preselection exposure range. The window plate 501 mounted on the camera housing permits for the operator to see characters EE through the window thereof. When the operator turns the diaphragm preselecting ring 41 to place the EE symbol out of alignment with the index 100, the slide 204 is downwardly moved as mentioned before to turn a lever 502 in a counter-clockwise direction, thereby the display plate is moved in a direction indicated by the arrow to place a character M under the window 501, indicating that the camera is set for manual operation. Next, the shutter speed-preselecting dial is turned to place the Auto symbol in alignment with the index 205, the detent pin 201' turns a lever 504 in a counter-clockwise direction to move the display plate 503 in the opposite direction to that indicated by the arrow against the bias of the spring 505, thereupon the character A is positioned under the window 501 indicating that the camera is set for operation in the diaphragm aperture preselection exposure range. The provision for making it possible to move the display plate in the opposite direction is made in an elongated slot 503' provided through the display plate 503.

It is seen from the foregoing disclosure that the camera of the present invention can be readily adjusted to any exposure range as desired by the operator while reliably preventing the double automatic exposure control range adjustment.

What is claimed is:

1. An exposure control apparatus for a camera adapted for automatic exposure by means of either a shutter speed preselection system or a diaphragm preselection system comprising:
   a shutter speed setting member having a single automatic setting adjustment position and a plurality of manual setting adjustment positions and including a shutter speed control means being connected with said setting member;
   a diaphragm setting member provided apart from said shutter speed setting member having a single automatic setting adjustment position and a plurality of manual setting adjustment positions, and including a diaphragm control means being connected with said setting member;
   a first interference member fixed to said shutter speed setting member and rotatable to a predetermined adjustment position only when said diaphragm member is not in an automatic adjustment position; and
   a second interference member mounted for sliding along a guide and capable of entering the path of rotation of said first interference member in association with the movement of a diaphragm setting member to its automatic adjustment position only when said shutter speed setting member is not in an automatic adjustment position, one of said two interference members interfering with the movement of the other member to said predetermined adjustment position and preventing said movement when said predetermined adjustment position is initially occupied by the former interference member.

2. An exposure control apparatus according to claim 1 wherein said first interference member is a pin fixed to said shutter speed setting member and said second interference member is a sliding plate capable of sliding along its longitudinal direction, said first interference member preventing the movement of said diaphragm setting member to its automatic adjustment position when said shutter speed setting member occupies its automatic adjustment position.

3. A dual automatic exposure control apparatus for a single lens reflex camera adapted for automatic exposure by means of either a shutter speed preselection system or a diaphragm pre-preselection system comprising:
   a. a photometric means having a photoelectric transducer provided to receive light through the taking lens with its fully opened aperture;
   b. a shutter speed setting member having a single automatic setting position and a plurality of manual setting positions and including a shutter speed control means being associated with said setting means;
   c. a photosensitive diaphragm predefining means responsive to the output of the photometric means;
   d. a diaphragm setting member having a single automatic setting position where the photosensitive diaphragm predefining means is brought into effective condition and a plurality of manual presetting positions, and including a diaphragm control means being associated with said setting member;
   e. a photosensitive shutter control means responsive to the output of the photometric means and brought into effective condition at the shutter speed automatic setting position;
   f. an aperture control means for bringing its aperture to a preselected or predefined value for the diaphragm; and
   g. an interference means movable to an automatic adjustment position for shutter speed setting member only when said diaphragm presetting member is not in an automatic adjustment position and movable to an automatic adjustment position for diaphragm setting member only when said shutter speed setting member is not in an automatic adjustment position.

4. An apparatus according to claim 3 which further comprises a display device arranged to selectively indicate the operating ranges of the camera in response to the setting of either said shutter speed setting member or said diaphragm aperture setting member to its automatic adjustment position, or to simultaneous settings of both said members to their manual positions.

5. An exposure control apparatus according to claim 3 wherein said shutter speed setting member is a rotatable shutter dial provided on a side of a camera.

6. An exposure control apparatus according to claim 3 wherein said diaphragm setting member is a ring rotatable about the optical axis, and is provided with a change-over cam to actuate said second interference member.

* * * * *